US012154475B2

(12) United States Patent
Zheng et al.

(10) Patent No.: US 12,154,475 B2
(45) Date of Patent: Nov. 26, 2024

(54) DISPLAY PANEL AND GRAYSCALE COMPENSATION METHOD

(71) Applicant: WUHAN CHINA STAR OPTOELECTRONICS SEMICONDUCTOR DISPLAY TECHNOLOGY CO., LTD., Hubei (CN)

(72) Inventors: Jinlong Zheng, Hubei (CN); Chunsheng Li, Hubei (CN); Kuo Wang, Hubei (CN)

(73) Assignee: WUHAN CHINA STAR OPTOELECTRONICS SEMICONDUCTOR DISPLAY TECHNOLOGY CO., LTD., Hubei (CN)

( * ) Notice: Subject to any disclaimer, the term of this patent is extended or adjusted under 35 U.S.C. 154(b) by 0 days.

(21) Appl. No.: 17/758,020

(22) PCT Filed: May 18, 2022

(86) PCT No.: PCT/CN2022/093513
§ 371 (c)(1),
(2) Date: Jun. 26, 2022

(87) PCT Pub. No.: WO2023/212984
PCT Pub. Date: Nov. 9, 2023

(65) Prior Publication Data

US 2024/0169878 A1 May 23, 2024

(30) Foreign Application Priority Data

May 5, 2022 (CN) ......................... 202210480197.8

(51) Int. Cl.
*G09G 3/3208* (2016.01)
*G09G 3/20* (2006.01)
*G09G 3/3225* (2016.01)

(52) U.S. Cl.
CPC ......... *G09G 3/2074* (2013.01); *G09G 3/3225* (2013.01); *G09G 2300/0452* (2013.01); *G09G 2310/08* (2013.01); *G09G 2320/0233* (2013.01)

(58) Field of Classification Search
CPC ......... G09G 3/3225; G09G 2320/0233; G09G 3/3208
See application file for complete search history.

(56) References Cited

U.S. PATENT DOCUMENTS

| | | | | |
|---|---|---|---|---|
| 2018/0144719 | A1 | 5/2018 | Lee et al. | |
| 2020/0279534 | A1 * | 9/2020 | Ji | G09G 3/36 |

(Continued)

FOREIGN PATENT DOCUMENTS

| | | | |
|---|---|---|---|
| CN | 103531175 | A | 1/2014 |
| CN | 109545144 | A | 3/2019 |

(Continued)

OTHER PUBLICATIONS

International Search Report in International application No. PCT/CN2022/093513,mailed on Dec. 16, 2022.

(Continued)

*Primary Examiner* — Dennis P Joseph
(74) *Attorney, Agent, or Firm* — PV IP PC; Wei Te Chung

(57) ABSTRACT

The present application provides a display panel and a grayscale compensation method. The grayscale compensation method first divides a display area of the display panel into a first display sub-area and a second display sub-area, and then takes average brightness of the at least one second (Continued)

display sub-area as target brightness and compensates a grayscale of each sub-pixel in the at least one second display sub-area. Accordingly, the present application not only improves the brightness uniformity of the display area, but also requires less gray scale compensation data.

8 Claims, 12 Drawing Sheets

(56) References Cited

U.S. PATENT DOCUMENTS

2023/0069956 A1* 3/2023 Chen .................... G09G 3/2092
2024/0038187 A1* 2/2024 Wang ....................... G09G 3/36

FOREIGN PATENT DOCUMENTS

CN 109658876 A 4/2019
CN 110447061 A 11/2019
CN 111816112 A 10/2020

OTHER PUBLICATIONS

Written Opinion of the International Search Authority in International application No. PCT/CN2022/093513,mailed on Dec. 16, 2022.

* cited by examiner

DISPLAY PANEL AND GRAYSCALE COMPENSATION METHOD

FIELD OF DISCLOSURE

The present application relates to a field of display technology and in particular, to a display panel and a grayscale compensation method.

DESCRIPTION OF RELATED ART

There are innovations in display technology every day. At the same time, there are also defects in display panels that need to be continuously improved. For example, predetermined brightness uniformity objectives have not been achieved. That is the case especially in a middle display area of the display panel, which can be a middle portion in a width direction and/or a length direction of the display panel. The display brightness of the middle portion is darker or brighter than the display brightness of a surrounding portion, resulting in poor brightness uniformity of the display panel and affecting the display quality.

SUMMARY

The present application provides a display panel and a grayscale compensation method to alleviate a technical problem that more grayscale compensation data are required in a compensation process for realizing brightness uniformity.

In a first aspect, the present application provides a grayscale compensation method for a display panel, including:

configuring a display area of the display panel as at least one first display sub-area and at least one second display sub-area;

determining average brightness of the at least one second display sub-area as target brightness; and compensating a grayscale of each sub-pixel in the at least one second display sub-area until the target brightness is reached.

In some embodiments, the grayscale compensation method further includes:

configuring the display area as one first display sub-area and eight second display sub-areas, wherein an area of the first display sub-area is same as an area of each of at least one of the eight second display sub-areas;

constructing the first display sub-area and the eight second display sub-areas to be an array; and determining the average brightness of at least one of the first one and the third one of the second display sub-areas from left to right in a second row as the target brightness.

In some embodiments, the grayscale compensation method further includes:

determining a resolution of the display panel; and based on the resolution, dividing each of the second display sub-areas into at least one display block, wherein the resolution is proportional to a number of the at least one display block in the same second display sub-area.

In some embodiments, the grayscale compensation method further includes:

determining grayscale gain coefficients corresponding to the sub-pixels of various colors in each of the display blocks; and individually adjusting the grayscale gain coefficients corresponding to the sub-pixels of various colors until the target brightness is reached.

The process of individually adjusting the grayscale gain coefficients corresponding to the sub-pixels of various colors until the target brightness is reached includes:

$$Rx\_Block\_output = Rx\_input * Rx\_Gain$$

$$Gx\_Block\_output = Gx\_input * Gx\_Gain$$

$$Bx\_Block\_output = Bx\_input * Bx\_Gain$$

wherein Rx_input, Gx_input, and Bx_input respectively represent an initial grayscale of a red sub-pixel, an initial grayscale of a green sub-pixel, and an initial grayscale of a blue sub-pixel in the display block at an x position; Rx_Gain, Gx_Gain, and Bx_Gain respectively represent the grayscale gain coefficient of the red sub-pixel, the grayscale gain coefficient of the green sub-pixel, and the grayscale gain coefficient of the blue sub-pixel in the display block at the x position; and Rx_Block_output, Gx_Block_output, and Bx_Block_output respectively represent a target grayscale of the red sub-pixel, a target grayscale of the green sub-pixel, and a target grayscale of the blue sub-pixel in the display block at the x position, and wherein the target grayscales correspond to the target brightness.

In some embodiments, the grayscale compensation method further includes:

determining that an area where 2N rows and/or columns of the sub-pixels starting from a boundary between the adjacent two display blocks are located is a boundary area; and performing an interpolation method to process the grayscale, corresponding to the target brightness, of each sub-pixel located in the boundary area.

In some embodiments, the process of performing the interpolation method to process the grayscale, corresponding to the target brightness, of each sub-pixel located in the boundary area includes:

$$Rm\_Block\_output1 = (Rx\_Block\_output - Rx{+}1\_Block\_output)/2N * m + Rx\_Block\_output$$

$$Gm\_Block\_output1 = (Gx\_Block\_output - Gx{+}1\_Block\_output)/2N * m + Gx\_Block\_output$$

$$Bm\_Block\_output1 = (Bx\_Block\_output - Bx{+}1\_Block\_output)/2N * m + Bx\_Block\_output$$

wherein N is a number of the rows or columns of the sub-pixels starting from the boundary and located in the boundary area in the corresponding display block, m is a row number or a column number of the sub-pixel starting from the boundary; Rm_Block_output1, Gm_Block_output1, and Bm_Block_output1 represent an interpolated grayscale of the red sub-pixel of the m-th row/column, an interpolated grayscale of the green sub-pixel of the m-th row/column, and an interpolated grayscale of the blue sub-pixel of the m-th row/column; Rx+1_Block_output, Gx+1_Block_output, and Bx+1_Block_output represent the target grayscale of the red sub-pixel, the target grayscale of the green sub-pixel, and the target grayscale of the blue sub-pixel in the display block at an (x+1) position; and the display block where the sub-pixel of the m-th row/column is located is adjacent to the display block at the x position and the display block at the (x+1) position.

In some embodiments, the grayscale compensation method further includes:

determining the corresponding sub-pixels in the boundary area that are repeatedly processed by the interpolation method; and averaging the grayscales of the corresponding sub-pixels repeatedly processed by the interpolation method.

In some embodiments, the process of averaging the grayscales of the corresponding sub-pixels repeatedly processed by the interpolation method comprises:

$$Rm\_Block\_output=(Rm\_Block\_output1+Rm+1\_Block\_output1)/2$$

$$Gm\_Block\_output=(Gm\_Block\_output1+Gm+1\_Block\_output1)/2$$

$$Bm\_Block\_output=(Bm\_Block\_output1+Bm+1\_Block\_output1)/2$$

wherein Rm_Block_output, Gm_Block_output, and Bm_Block_output respectively represent an averaged grayscale of the red sub-pixels, an averaged grayscale of the green sub-pixels, and an averaged grayscale of the blue sub-pixels in the m-th row/column repeatedly processed by the interpolation method; and Rm+1_Block_output1, Gm+1_Block_output1, and Bm+1_Block_output1 respectively represent the grayscale of the red sub-pixel after the sub-pixels in the (m+1)-th row/column are processed by the interpolation method, the grayscale of the green sub-pixel after the sub-pixels in the (m+1)-th row/column are processed by the interpolation process, and the grayscale of the blue sub-pixel after the sub-pixels in the (m+1)-th row/column are processed by the interpolation process.

In some embodiments, before the step of compensating the grayscale of each sub-pixel in the at least one second display sub-area until the target brightness is reached, the grayscale compensation method further comprises:

determining whether a frame image to be displayed is a frame image of a designated type, and the frame image of the designated type is a frame image whose brightness uniformity is less than or equal to brightness uniformity of a frame image with a preset ratio and a normal visual effect;

If affirmative, performing the step of compensating the grayscale of each sub-pixel in the at least one second display sub-area until the target brightness is reached; and If negative, directly displaying the frame image to be displayed.

In a second aspect, the present application provides a display panel, including:

a timing controller, wherein the timing controller stores a grayscale compensation table, and the grayscale compensation table is made according to the grayscale compensation method of at least one of the above embodiments.

Advantages of the Present Application

In the display panel and the grayscale compensation method of the present application, a display area of the display panel is first divided into at least one first display sub-area and at least one second display sub-area. Then, the average brightness of the at least one second display sub-area is used as the target brightness to compensate the grayscale of each sub-pixel in the at least one second display sub-area, so as to reduce a brightness difference between the first display sub-area and the second display sub-area, and improve brightness uniformity of the display area. Moreover, since the grayscale compensation is only performed on the sub-pixels in the at least one second display sub-area, less grayscale compensation data are required.

DETAILED DESCRIPTION OF EMBODIMENTS

In order to make the objectives, technical solutions, and effects of the present application clearer and more definite, the present application is further described in detail below with reference to the accompanying drawings and specific embodiments. It should be understood that the specific embodiments described herein are only used to explain the present application, but not to limit the present application.

Figure 1:
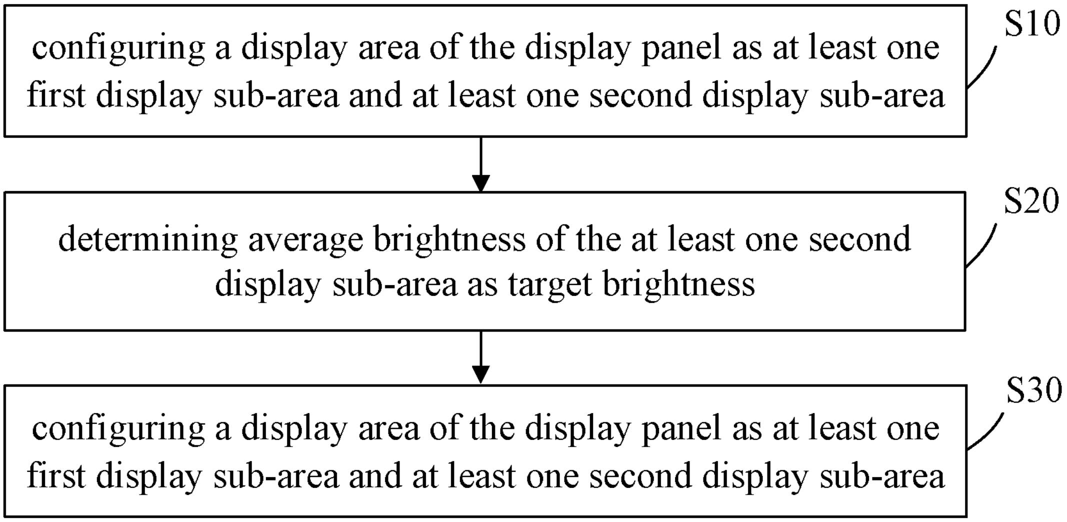
FIG. 1 is a first process flow diagram of a grayscale compensation method according to one embodiment of the present application.

In view of the above-mentioned technical problem that more grayscale compensation data is required in a process of brightness uniformity compensation, the present application provides a grayscale compensation method for a display panel. Please refer to FIGS. 1 to 15. As shown in FIGS. 1 and 4, the grayscale compensation method includes the following steps:

Step S10: configuring a display area of the display panel as at least one first display sub-area and at least one second display sub-area.

Step S20: determining average brightness of the at least one second display sub-area as target brightness.

Step S30: compensating a grayscale of each sub-pixel in the at least one second display sub-area until the target brightness is reached.

It can be understood that, in the grayscale compensation method of the present application, a display area AA of the display panel is first divided into at least one first display sub-area and at least one second display sub-area. Then, the average brightness of the at least one second display sub-area is used as the target brightness to compensate the grayscale of each sub-pixel in the at least one second display sub-area, so as to reduce a brightness difference between the first display sub-area and the second display sub-area, and improve brightness uniformity of the display area AA. Moreover, since the grayscale compensation is only performed on each sub-pixel in the at least one second display sub-area, less grayscale compensation data are required.

It should be noted that, in the present application, a number of the first display sub-areas and a number of the second display sub-areas are not specifically limited, and configurations can vary as required.

Figure 2:
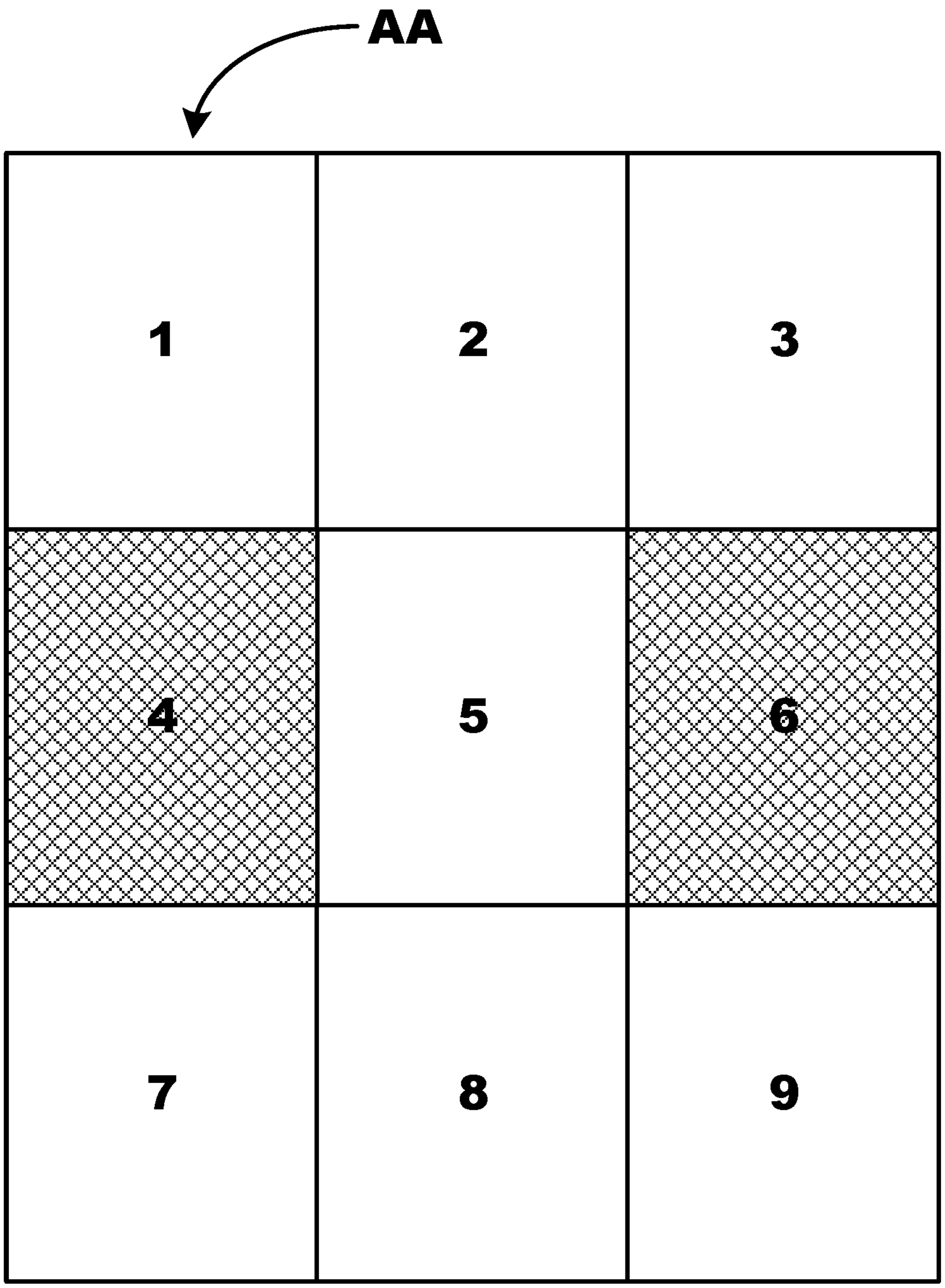
FIG. 2 is a schematic view illustrating a first layout for a first display sub-area and a second display sub-area according to one embodiment of the present application.

For example, in FIG. 2, a display sub-area 4 and a display sub-area 6 can be designated as two different first display sub-areas; and at least one of a display sub-area 1, a display sub-area 2, a display sub-area 3, a display sub-area 5, a display sub-area 7, a display sub-area 8, and a display sub-area 9 is the second display sub-area different form the first display sub-areas; however, the present application is not limited in this regard.

Figure 3:
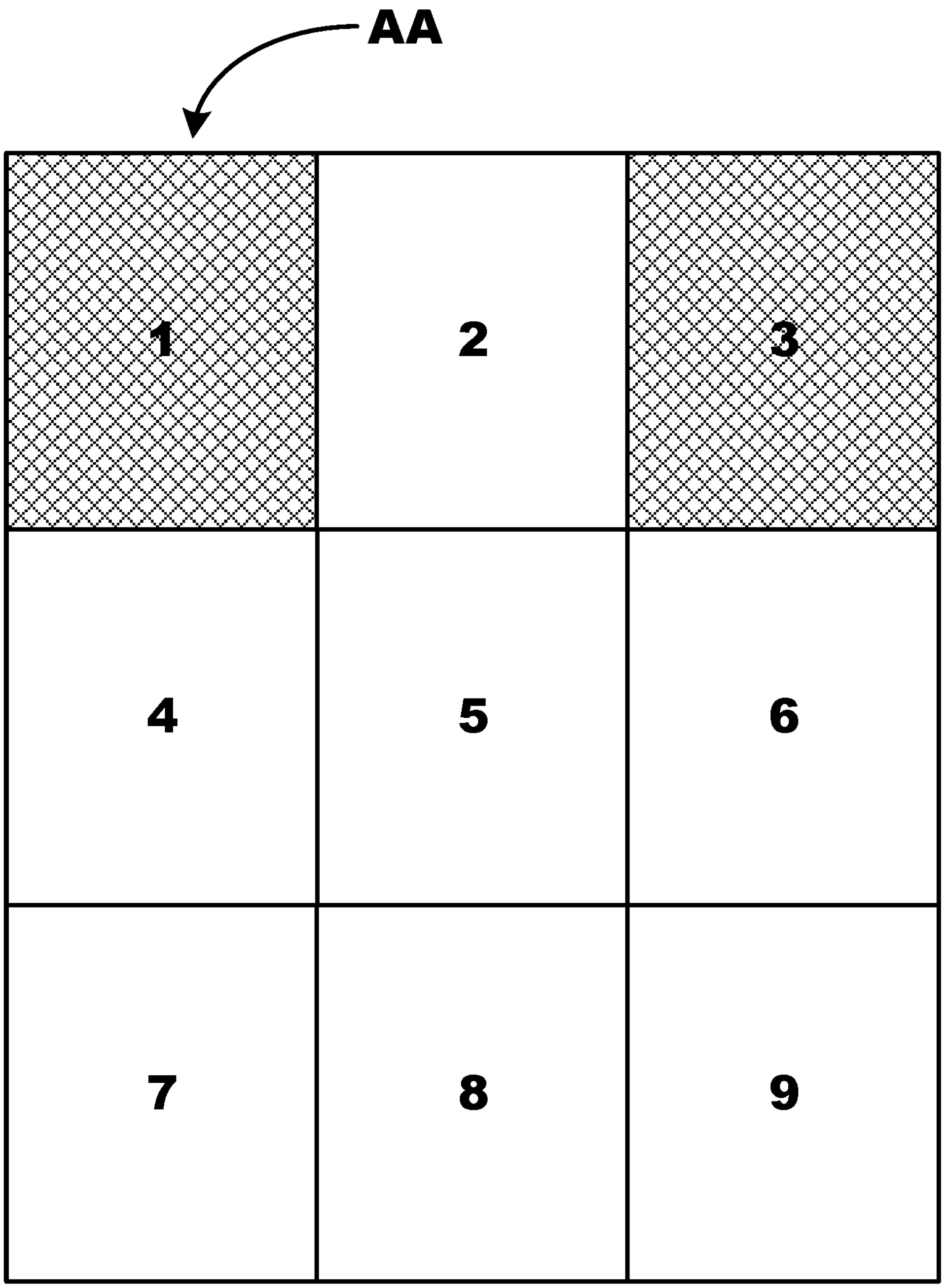
FIG. 3 is a schematic view illustrating a second layout for the first display sub-area and the second display sub-area according to one embodiment of the present application.
Figure 4:
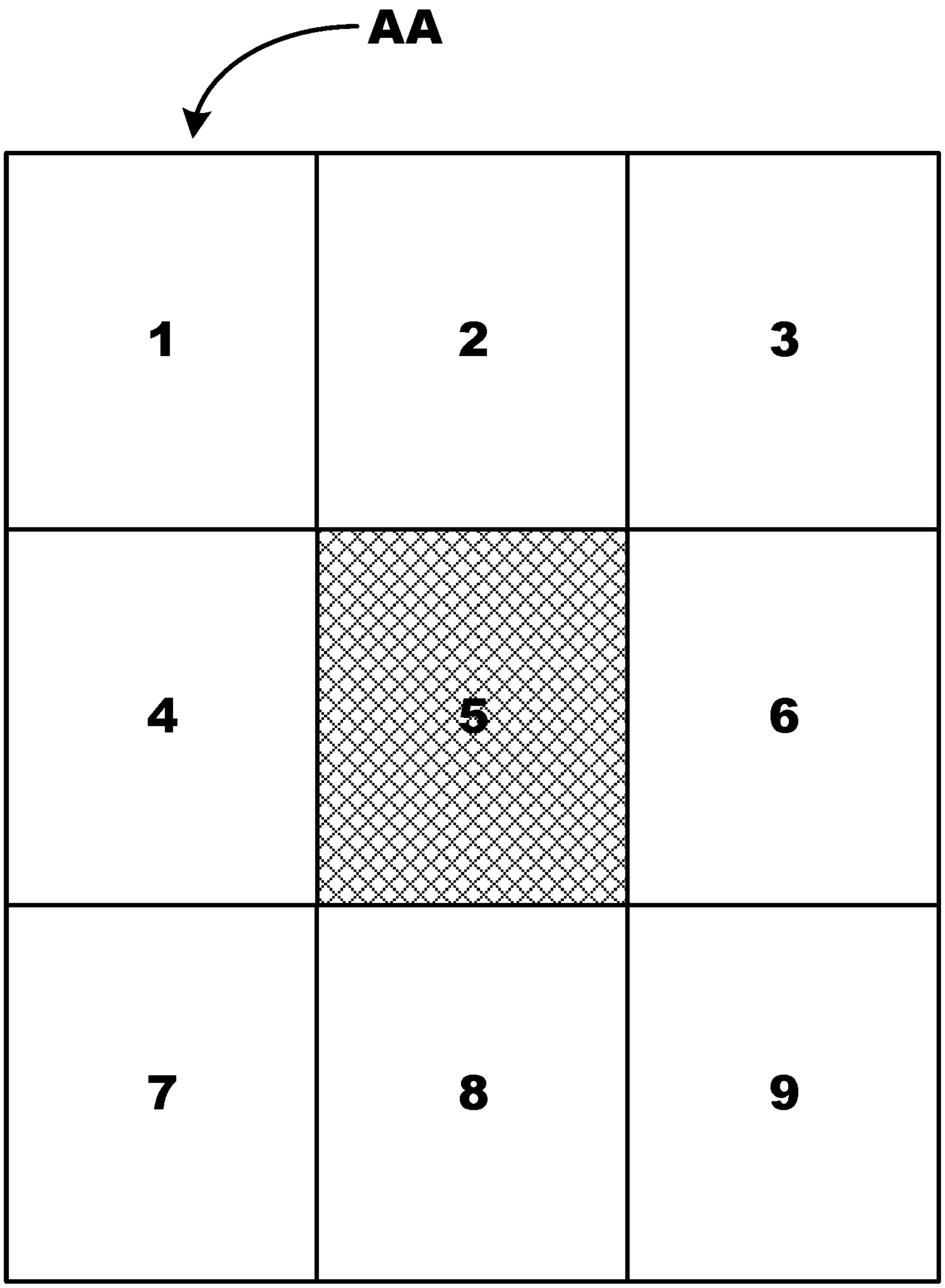
FIG. 4 is a schematic view illustrating a third layout for the first display sub-area and the second display sub-area according to one embodiment of the present application.

For another example, in FIG. 3, the display sub-area 1 and the display sub-area 3 can be designated as two different first display sub-areas; at least one of the display sub-area 2, the display sub-area 4, the display sub-area 5, the display sub-area 6, the display sub-area 7, the display sub-area 8, and the display sub-area 9 is the second display sub-area different from the first display sub-areas.

In one embodiment, the grayscale compensation method further includes: configuring the display area AA as one first display sub-area and eight second display sub-areas, wherein an area of the first display area is same as an area of each of the at least one second display area; constructing the first display sub-area and the eight second display sub-areas to be an array; and determining the average brightness, of at least one of the first one and the third one of the second display sub-areas from left to right in a second row, as the target brightness.

Figure 5:
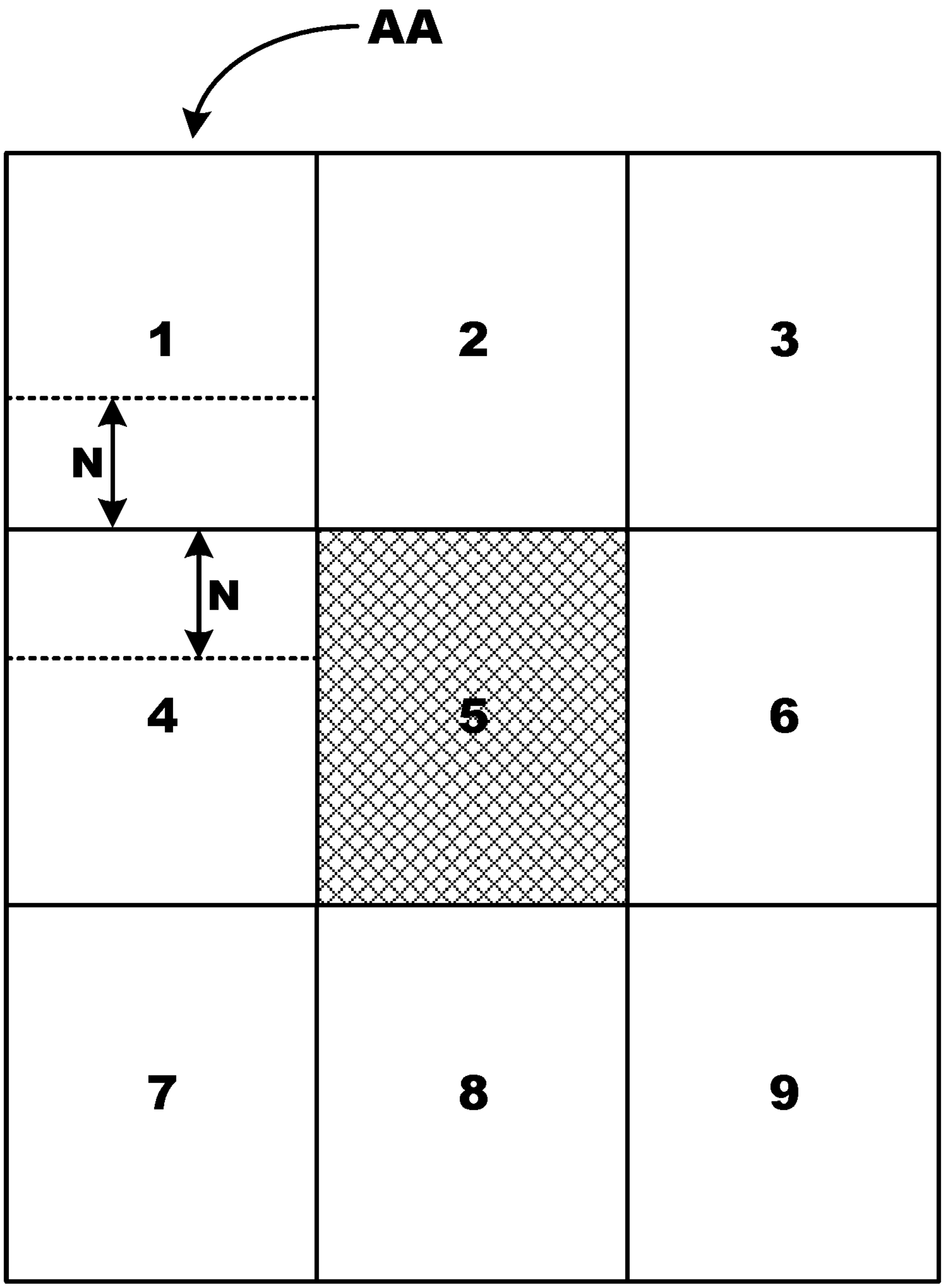
FIG. 5 is a schematic layout view of a boundary area according to one embodiment of the present application.
Figure 6:
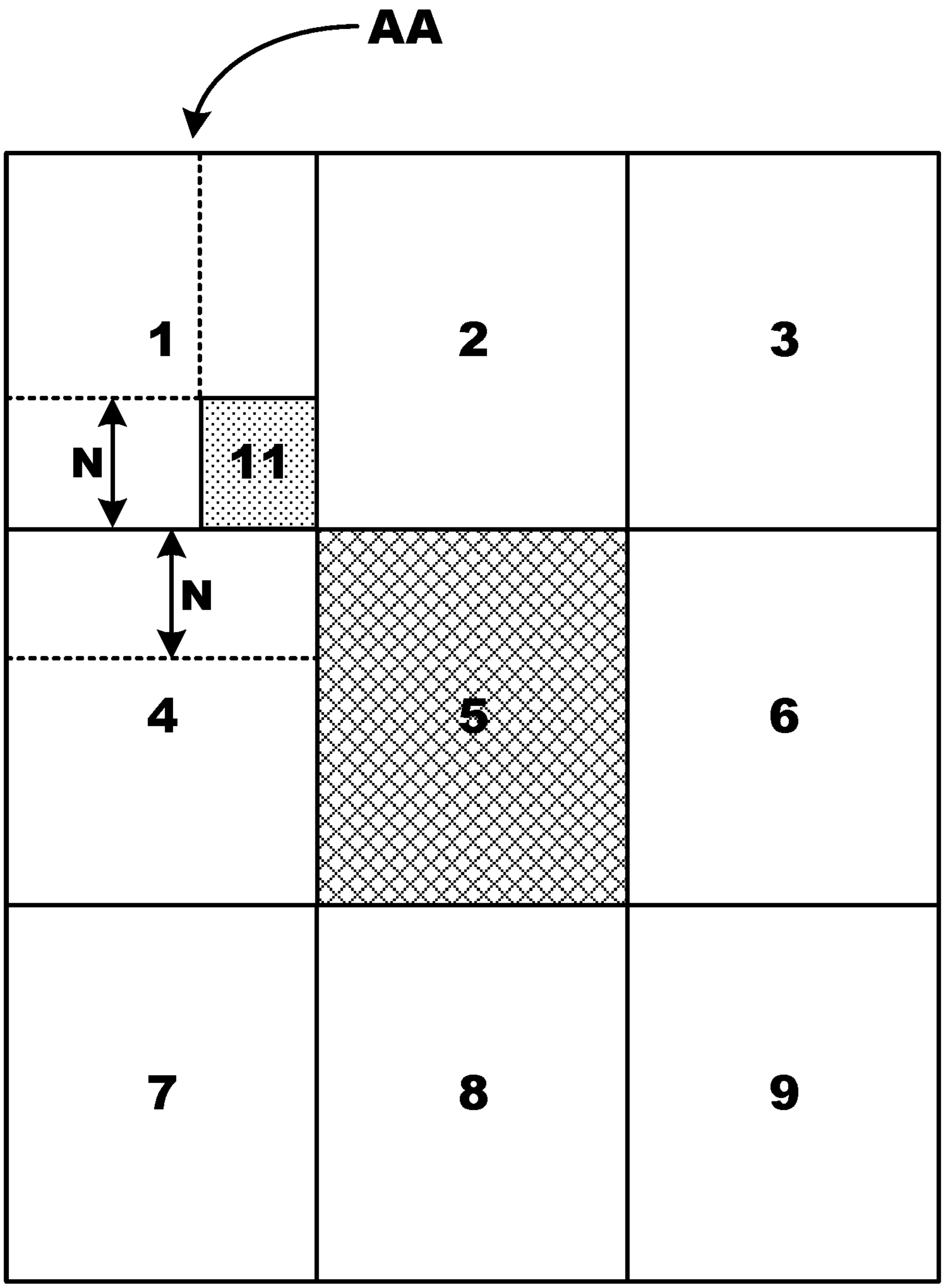
FIG. 6 is a schematic view illustrating an area repeated processed by the interpolation method according to one embodiment of the present application.

It should be noted that, as shown in FIG. 4 to FIG. 6, the first display sub-area can be the display sub-area 5, and the eight second display sub-areas can be respectively the display sub-area 1, the display sub-area 2, the display sub-area 3, the display sub-area 4, the display sub-area 6, the display sub-area 7, the display sub-area 8, and the display sub-area 9. The first one of the second display sub-areas from left to right in the second row is the display sub-area 4, and the third one of the second display sub-areas from left to right in the second row is the display sub-area 6.

It can be understood that as the number of the display sub-areas increases, the accuracy of grayscale compensation is also higher, which is more conducive to achieving brightness uniformity; however, as the number of the display sub-areas increases, more grayscale compensation data are required. In view of this, after many comparisons of test data, the present embodiment divides the display area AA of the display panel 100 into one first display sub-area and eight second display sub-areas. Consequently, less grayscale compensation data is required to achieve higher brightness uniformity.

Since the display sub-area 4 and the display sub-area 6 are both in a middle position in a length direction or a width direction of the display panel, the average brightness of one of the display sub-area 4 and the display sub-area 6 is closer to the average brightness of the display area AA. That is to say, by taking the average brightness of one of the display sub-area 4 and the display sub-area 6 as the target brightness, the highest possible brightness uniformity can be achieved with a smallest possible amount of grayscale compensation.

In one embodiment, the grayscale compensation method further includes: determining a resolution of the display panel; and based on the resolution, dividing each of the second display sub-areas into at least one display block, wherein the resolution proportional to a number of the at least one display block in the same second display sub-area.

It should be noted that each of the above-mentioned display blocks can include at least one row or at least one column of sub-pixels located in the corresponding display sub-area. It can be understood that the greater a number of the display blocks in the same second display sub-area, the higher the grayscale compensation accuracy. The display panel with a higher resolution has a larger size. Therefore, by setting the resolution to be proportional to the number of the display blocks in the same second display sub-area, the present application can have flexible grayscale compensation. Accordingly, display panels of different sizes can achieve the required brightness uniformity, and have a wide range of applications.

In one embodiment, the grayscale compensation method further includes: determining grayscale gain coefficients corresponding to the sub-pixels of various colors in each of the display blocks; and individually adjusting the grayscale gain coefficients corresponding to the sub-pixels of various colors until the target brightness is reached.

It should be noted that the above-mentioned grayscale gain coefficients can be used to adjust the grayscale of the corresponding sub-pixel, and each grayscale corresponds to a brightness level. Therefore, a suitable grayscale gain coefficient can be selected during an adjustment process to thereby make different sub-pixels have suitable grayscales, so that the corresponding target brightness can be achieved.

A process of individually adjusting the grayscale gain coefficients corresponding to the sub-pixels of various colors until the target brightness is reached includes:

$$Rx\_Block\_output=Rx\_input*Rx\_Gain$$

$$Gx\_Block\_output=Gx\_input*Gx\_Gain$$

$$Bx\_Block\_output=Bx\_input*Bx\_Gain$$

wherein Rx_input, Gx_input, and Bx_input respectively represent an initial grayscale of a red sub-pixel, an initial grayscale of a green sub-pixel, and an initial grayscale of a blue sub-pixel in the display block at an x position; Rx_Gain, Gx_Gain, and Bx_Gain respectively represent the grayscale gain coefficient of the red sub-pixel, the grayscale gain coefficient of the green sub-pixel, and the grayscale gain coefficient of the blue sub-pixel in the display block at the x position; and Rx_Block_output, Gx_Block_output, and Bx_Block_output respectively represent a target grayscale of the red sub-pixel, a target grayscale of the green sub-pixel, and a target grayscale of the blue sub-pixel in the display block at the x position, and wherein the target grayscales correspond to the target brightness.

It can be understood that, the present embodiment can perform grayscale compensation on each sub-pixel according to its color, and can achieve higher grayscale compensation accuracy with a simpler grayscale compensation process.

In one embodiment, as shown in FIG. 5, the grayscale compensation method further includes:

determining that an area where 2N rows and/or columns of the sub-pixels starting from a boundary between the adjacent two display blocks are located is a boundary area; and performing an interpolation method to process the grayscale, corresponding to the target brightness, of each sub-pixel located in the boundary area.

It should be noted that, in the present embodiment, the grayscales of the sub-pixels in the boundary area of the adjacent display block can be smoothed, so that display brightness in the boundary area transitions smoothly, and the brightness uniformity of the display is further improved.

In one embodiment, the process of performing the interpolation method to process the grayscale, corresponding to the target brightness, of each sub-pixel located in the boundary area includes:

$$Rm\_Block\_output1=(Rx\_Block\_output-Rx+1\_Block\_output)/2N*m+Rx\_Block\_output$$

$$Gm\_Block\_output1=(Gx\_Block\_output-Gx+1\_Block\_output)/2N*m+Gx\_Block\_output$$

$$Bm\_Block\_output1=(Bx\_Block\_output-Bx+1\_Block\_output)/2N*m+Bx\_Block\_output$$

wherein N is a number of the rows or columns of the sub-pixels starting from the boundary and located in the boundary area in the corresponding display block, m is a row number or a column number of the sub-pixel starting from the boundary; Rm_Block_output1, Gm_Block_output1, and Bm_Block_output1 represent an interpolated grayscale of the red sub-pixel of the m-th row/column, an interpolated grayscale of the green sub-pixel of the m-th row/column, and an interpolated grayscale of the blue sub-pixel of the m-th row/column; Rx+1_Block_output, Gx+1_Block_output, and Bx+1_Block_output represent the target grayscale of the red sub-pixel, the target grayscale of the green sub-pixel, and the target grayscale of the blue sub-pixel in the display block at an (x+1) position; and the display block where the sub-pixel of the m-th row/column is located is adjacent to the display block at the x position and the display block at the (x+1) position.

In one embodiment, as shown in FIG. 6, the grayscale compensation method further includes:

determining the corresponding sub-pixels in the boundary area that are repeatedly processed by the interpolation method; and averaging the grayscales of the corresponding sub-pixels repeatedly processed by the interpolation method.

It should be noted that the above-mentioned interpolation method causes grayscale transition compensation in an area 11 in FIG. 6, which affects the brightness uniformity of the display. In view of this, it is necessary to average the grayscales of the corresponding sub-pixels repeatedly processed by the interpolation method, so as to weaken the grayscale transition compensation of the corresponding sub-pixels and further improve the brightness uniformity of the display.

In one embodiment, the process of averaging the grayscales of the corresponding sub-pixels repeatedly processed by the interpolation method includes:

$$Rm\_Block\_output=(Rm\_Block\_output1+Rm+1\_Block\_output1)/2$$

$$Gm\_Block\_output=(Gm\_Block\_output1+Gm+1\_Block\_output1)/2$$

$$Bm\_Block\_output=(Bm\_Block\_output1+Bm+1\_Block\_output1)/2$$

wherein Rm_Block_output, Gm_Block_output, and Bm_Block_output respectively represent an averaged grayscale of the red sub-pixels, an averaged grayscale of the green sub-pixels, and an averaged grayscale of the blue sub-pixels in the m-th row/column repeatedly processed by the interpolation method; and Rm+1_Block_output1, Gm+1_Block_output1, and Bm+1_Block_output1 respectively represent the grayscale of the red sub-pixel after the sub-pixels in the (m+1)-th row/column are processed by the interpolation method, the grayscale of the green sub-pixel after the sub-pixels in the (m+1)-th row/column are processed by the interpolation process, and the grayscale of the blue sub-pixel after the sub-pixels in the (m+1)-th row/column are processed by the interpolation process.

Figure 7:
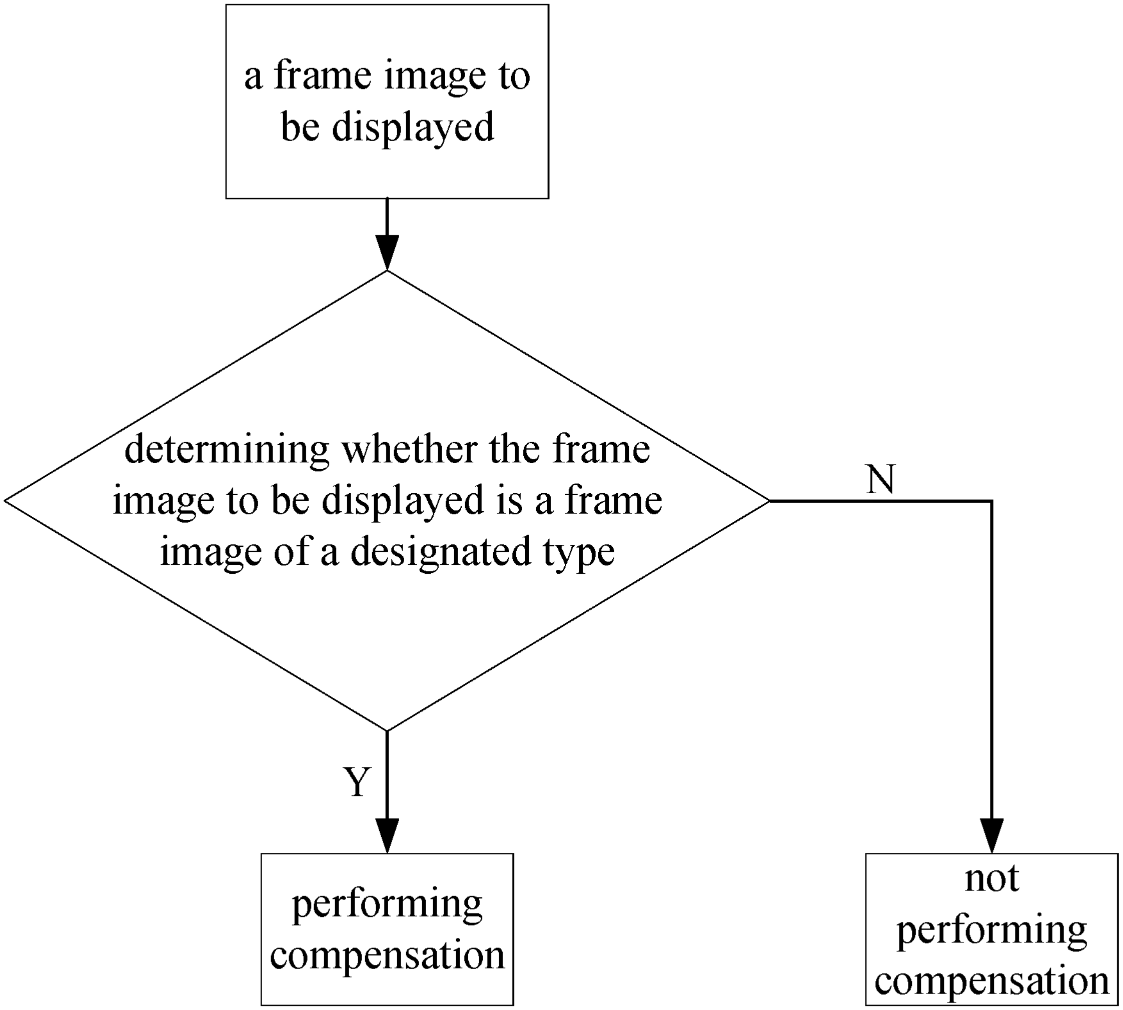
FIG. 7 is a second process flow diagram of the grayscale compensation method according to one embodiment of the present application.

In one embodiment, as shown in FIG. 7, before the step of compensating the grayscale of each sub-pixel in the at least one second display sub-area until the target brightness is reached, the grayscale compensation method further includes:

determining whether a frame image to be displayed is a frame image of a designated type, and the frame image of the designated type is a frame image whose brightness uniformity is less than or equal to brightness uniformity of a frame image with a preset ratio and a normal visual effect;

If affirmative, performing the step of compensating the grayscale of each sub-pixel in the at least one second display sub-area until the target brightness is reached; and If negative, directly displaying the frame image to be displayed.

It should be noted that the above-mentioned preset ratio can be, but is not limited to, 1.5%, and can also be set as a ratio required by customers.

Figure 8:
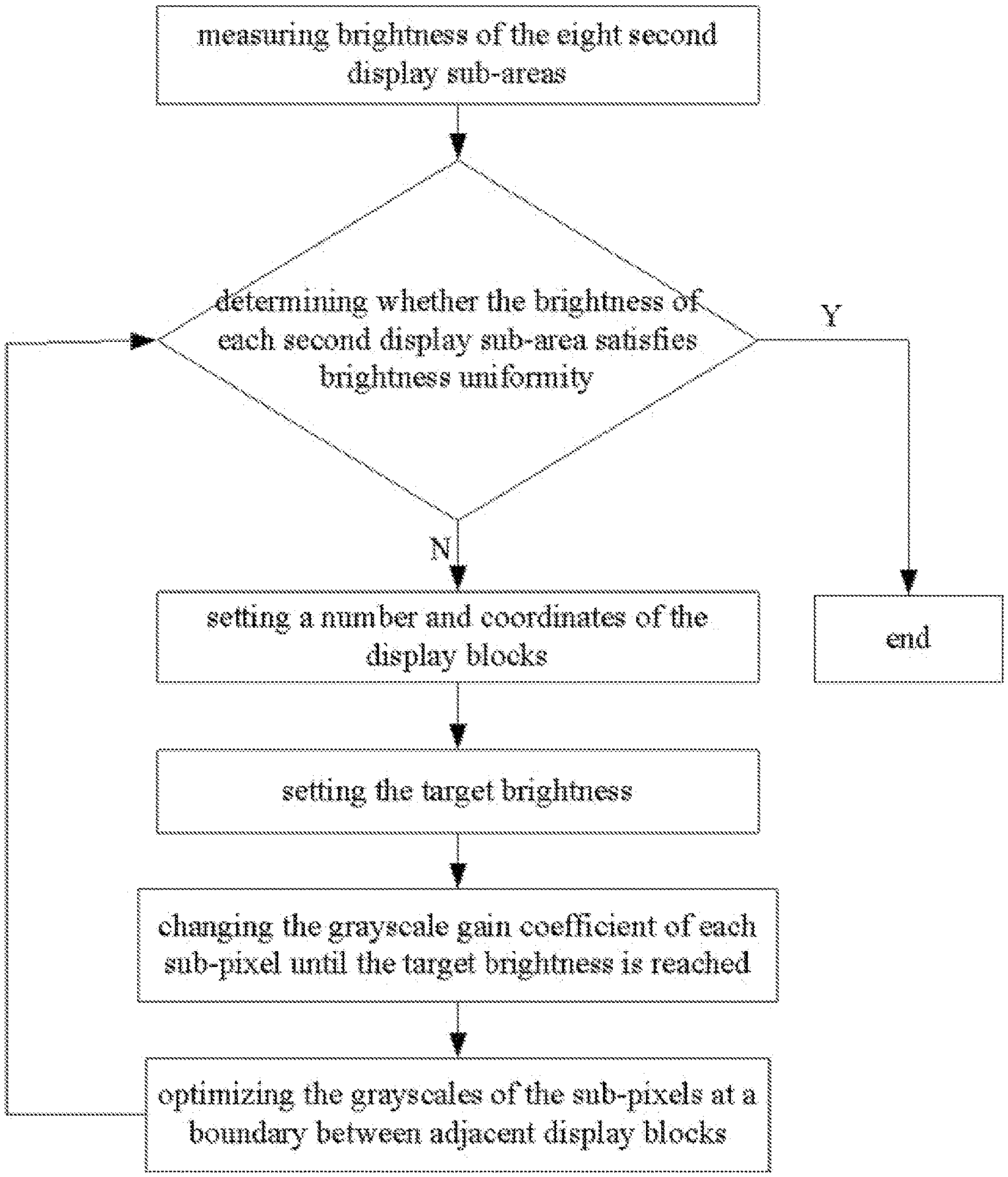
FIG. 8 is a third process flow diagram of the grayscale compensation method according to one embodiment of the present application.

In one embodiment, the grayscale compensation method can also be a specific process as shown in FIG. 8. First, measuring brightness of the eight second display sub-areas, and then determining whether the brightness of each second display sub-area meets a specific brightness uniformity requirement. If the requirements are met, it is the end, and no compensation is to be made; if not, a number and coordinates of the display blocks are set. It can be understood that the coordinates of four corners can be used for positioning in order to define an area where the corresponding display block is located. Then, setting the target brightness, adjusting the grayscale by changing the grayscale gain coefficient of each sub-pixel, and adjusting the grayscale of the corresponding sub-pixel until the target brightness is reached. Finally, optimizing the grayscales of the sub-pixels at a boundary between adjacent display blocks. The optimization can be, but not limited to, the above-mentioned interpolation method and/or the averaging, and can also be other methods that can improve brightness uniformity. Then, a brightness uniformity evaluation is performed on the optimized display to determine whether the brightness uniformity is satisfied.

Figure 9:
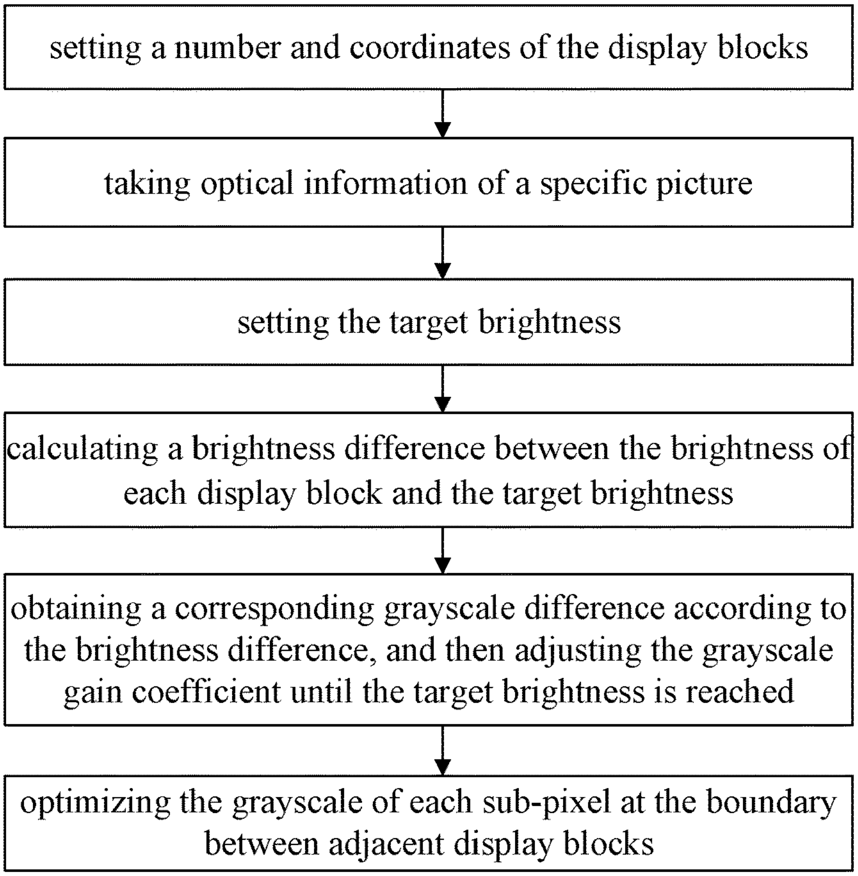
FIG. 9 is a fourth process flow diagram of the grayscale compensation method according to one embodiment of the present application.

In one embodiment, the grayscale compensation method can also be a specific process as shown in FIG. 9. First, setting a number and coordinates of the display blocks, and then obtaining brightness of each second display sub-area or each display block by taking optical information of a specific picture. Based on this, the corresponding target brightness is set accordingly, then a brightness difference between the brightness of each display block and the target brightness is calculated, and a corresponding grayscale difference is obtained according to the brightness difference, and then the grayscale gain coefficient is adjusted in order to change the grayscale of the corresponding sub-pixel until the display achieves the target brightness. Finally, the grayscale of each sub-pixel at the boundary between adjacent display blocks is optimized.

Obtaining the corresponding grayscale difference value according to the brightness difference can be realized by a brightness-grayscale conversion relationship, that is, $Lx/L255=(x/255)^{\wedge}2.2$. In the formula, x is used to represent the grayscale, Lx represents the brightness corresponding to the grayscale x, L255 represents the brightness corresponding to the grayscale 255. Further, 2.2 is a gamma coefficient, which can also be set to be other values as required.

Compared with the grayscale compensation process shown in FIG. 8, the grayscale compensation process shown in FIG. 9 is simpler and more efficient and accurate. Therefore, the grayscale compensation process shown in FIG. 9 usually only needs to be performed one time to be completed, and there is no need to review whether the brightness uniformity meets the requirements after the optimization process.

Figure 10:
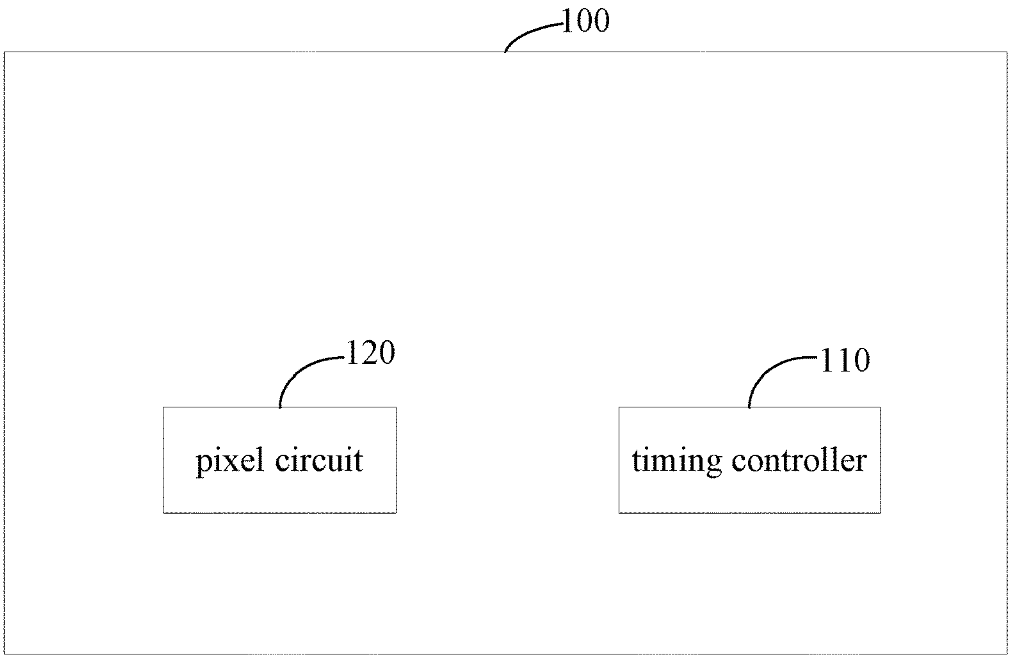
FIG. 10 is a schematic structural view of a display panel according to one embodiment of the present application.
Figure 11:
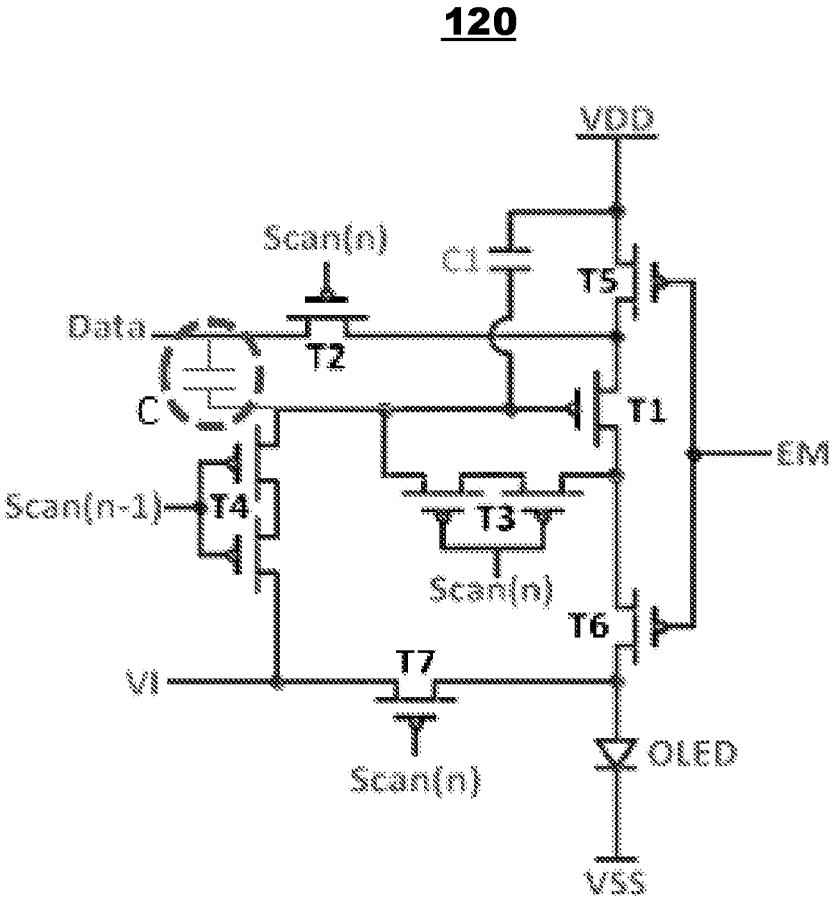
FIG. 11 is a schematic structural view of a pixel circuit according to one embodiment of the present application.

In one embodiment, as shown in FIG. 10 and FIG. 11, the display panel 100 further includes a pixel circuit 120 for display, and the pixel circuit 120 includes at least one of a driving transistor T1, a first light-emitting control transistor T5, and a second light-emitting control transistor T5, a second light-emitting control transistor T6, a writing transistor T2, a compensation transistor T3, a first initialization transistor T4, a second initialization transistor T7, a storage capacitor C1, or a light-emitting device OLED.

One of a source and a drain of the first light-emitting control transistor T5 is connected to one end of the storage capacitor C1 and connected to a positive power supply signal VDD. The other one of the source and the drain of the first light-emitting control transistor T5 is connected to one of a source and a drain of the driving transistor T1 and one of a source and a drain of the writing transistor T2. The other one of the source and the drain of the driving transistor T1 is connected to one of a source and a drain of the second light-emitting control transistor T6 and one of a source and a drain of the compensation transistor T3. The other one of the source and the drain of the second light-emitting control transistor T6 is connected to an anode of the light-emitting device OLED and one of a source and a drain of the second initialization transistor T7. A cathode of the light-emitting device OLED is connected to a negative power supply signal VSS. A gate of the second light-emitting control transistor T6 is connected to a gate of the first light-emitting control transistor T5 and connected to a light-emitting control signal EM. The other one of the source and the drain of the writing transistor T2 is connected to a data signal Data. A gate of the writing transistor T2, a gate of the compensation transistor T3, and a gate of the second initialization transistor T7 are connected to an n-th stage scan signal Scan(n). The other one of the source and the drain of the compensation transistor T3 is connected to a gate of the driving transistor T1, one of a source and a drain of the first initialization transistor T4, and another end of the storage capacitor C1. The other one of the source and the drain of the first initialization transistor T4 is connected to one of a source and a drain of the second initialization transistor T7 and is connected to an initialization signal VI. A gate of the first initialization transistor T4 is connected to an (n−1)-th stage scan signal Scan (n−1).

The compensation transistor T3 and the first initialization transistor T4 can both be combined transistors which are composed of two thin film transistors whose gates are connected to each other and are connected in series. This way, a gate leakage current of the driving transistor T1 can be prevented or reduced.

Figure 12:
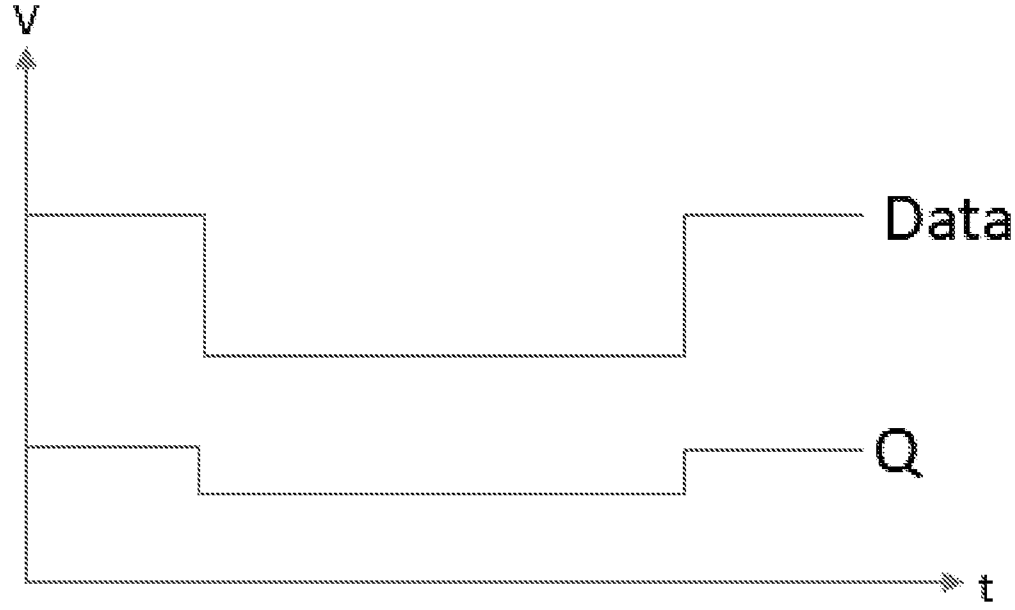
FIG. 12 is a timing diagram of a data signal and a gate potential of a driving transistor shown in FIG. 11.

It should be noted that the active-matrix organic light-emitting display panel 100 will form a circuit stacked structure. This design cannot avoid a parasitic capacitance C formed between a data line transmitting the data signal Data and the gate of the driving transistor T1 (as shown in FIG. 11, marked by a dashed circle). As shown in FIG. 12, when a potential of the data signal Data jumps from a high potential to a low potential (the corresponding display brightness is from black to gray), it is easy to generate crosstalk to a gate potential Q of the driving transistor T1. The jump voltage acts on the gate of the driving transistor T1 according to a proportion of the parasitic capacitance C to the storage capacitance C1, which will pull the gate potential Q of the driving transistor T1 high by ΔVQ, resulting in vertical crosstalk (V direction Crosstalk) with a darker middle display as shown in FIG. 13.

Figure 14:
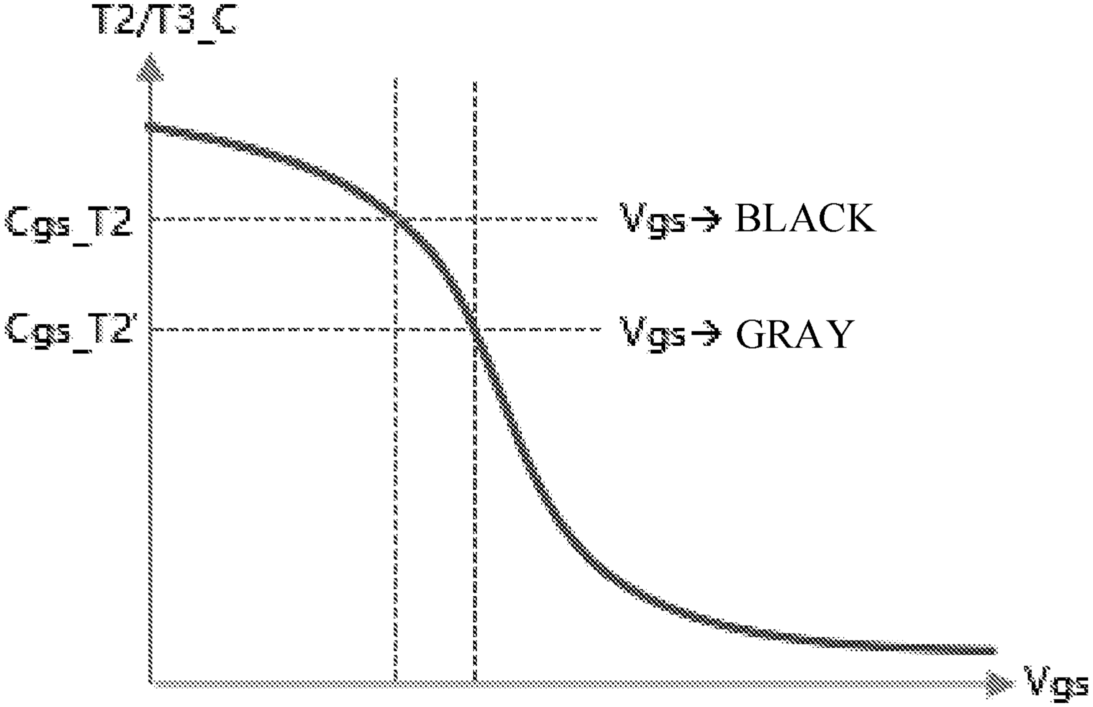
FIG. 14 is a schematic diagram showing a relationship between Cgs and Vgs of a corresponding transistor in FIG. 11.
Figure 15:
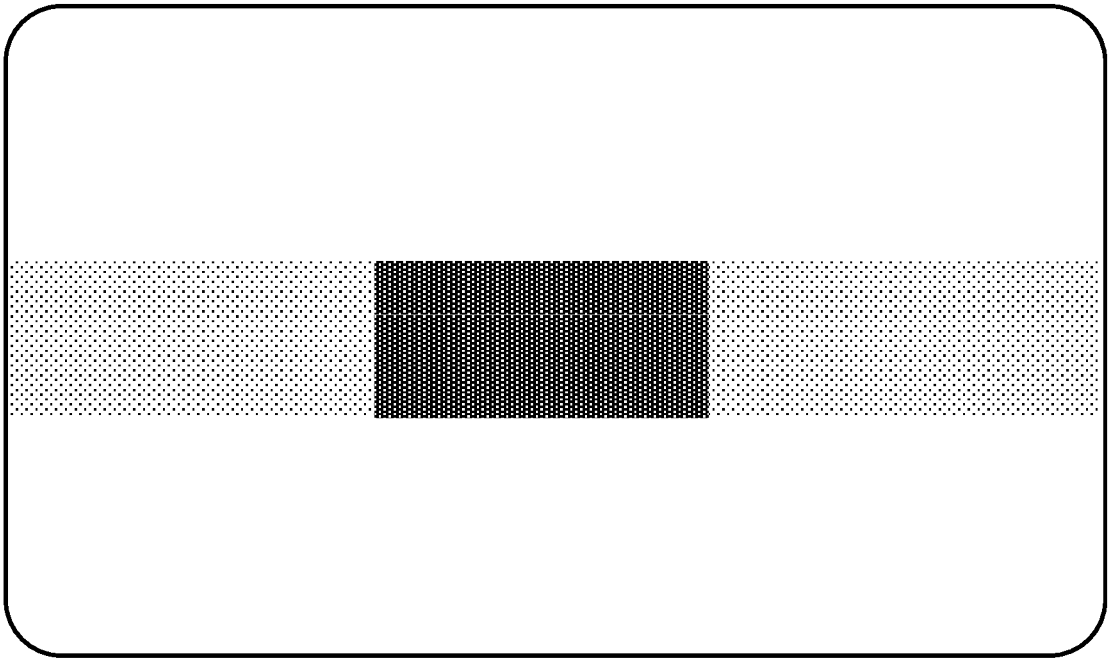
FIG. 15 illustrates a lateral crosstalk according to one embodiment of the present application.

A voltage of the data signal Data of a pixel row corresponding to a black block in a center position in FIG. 15 is mostly high level. That is to say, when the writing transistor T2 and/or the compensation transistor T3 in FIG. 11 and FIG. 14 are in an on state, a corresponding gate-source voltage difference Vgs is smaller. In other word, the parasitic capacitance Cgs between the gate and the source is great when the writing transistor T2 and/or the compensation transistor T3 is in the on state. As a result, the scan signal connected to the pixel row corresponding to the black block is greatly delayed (delay), the voltage of the data signal Data written to the gate of the driving transistor T1 is lower, leading to a lateral crosstalk (H direction crosstalk) with a brighter middle display as shown in FIG. 15.

Figure 13:
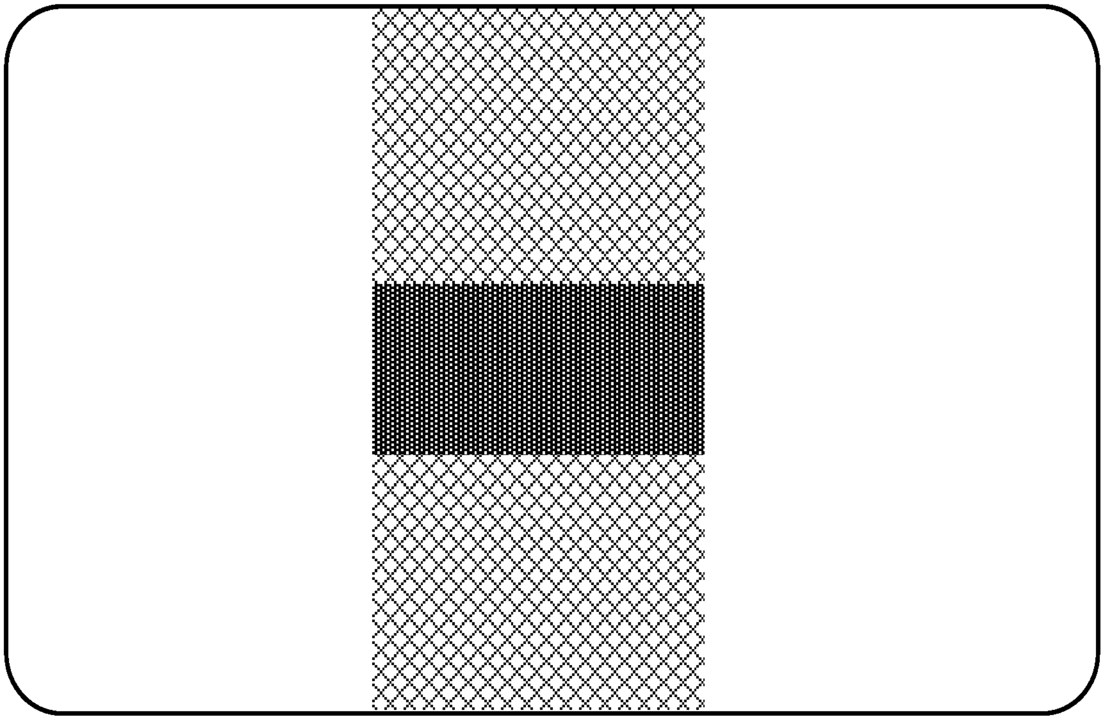
FIG. 13 illustrates a vertical crosstalk according to one embodiment of the present application.

It should be noted that both the two types of crosstalk shown in FIG. 13 and FIG. 15 can lower the brightness uniformity of the display panel 100. In view of this, the present embodiment provides a display panel 100, as shown in FIG. 10. The display panel 100 includes a timing controller 110, and the timing controller 110 stores a grayscale compensation table, and the grayscale compensation table is made according to the grayscale compensation method in at least one of the above-mentioned embodiments.

It can be understood that, in the display panel of the present application, a display area AA of the display panel is first divided into at least one first display sub-area and at least one second display sub-area. Then, the average brightness of the at least one second display sub-area is used as the target brightness to compensate the grayscale of each sub-pixel in the at least one second display sub-area, so as to reduce a brightness difference between the first display sub-area and the second display sub-area, and improve the brightness uniformity of the display area AA. Moreover, since the grayscale compensation is only performed on each sub-pixel in the at least one second display sub-area, less grayscale compensation data are required.

It can be understood that, those of ordinary skill in the art can make equivalent replacements or changes according to the technical solutions and the inventive concept of the present application, and all these changes or replacements should be within the protection scope of the appended claims of the present application.

What is claimed is:

1. A grayscale compensation method for a display panel, comprising:

configuring a display area of the display panel as at least one first display sub-area and at least one second display sub-area;

determining average brightness of the at least one second display sub-area as target brightness;

compensating a grayscale of each sub-pixel in the at least one second display sub-area until the target brightness is reached;

configuring the display area as one first display sub-area and eight second display sub-areas, wherein an area of the first display sub-area is same as an area of each of the eight second display sub-areas;

constructing the first display sub-area and the eight second display sub-areas to be an array;

determining the average brightness of at least one of the first one and the third one of the second display sub-areas from left to right in a second row as the target brightness;

determining a resolution of the display panel;

based on the resolution, dividing each of the second display sub-areas into at least one display block, wherein the resolution is proportional to a number of the at least one display block in the same second display sub-area;

determining grayscale gain coefficients corresponding to the sub-pixels of various colors in each of the display blocks; and individually adjusting the grayscale gain coefficients corresponding to the sub-pixels of various colors until the target brightness is reached, wherein the process of individually adjusting the grayscale gain coefficients corresponding to the sub-pixels of various colors until the target brightness is reached comprises:

$$Rx\_Block\_output = Rx\_input * Rx\_Gain$$

$$Gx\_Block\_output = Gx\_input * Gx\_Gain$$

$$Bx\_Block\_output = Bx\_input * Bx\_Gain$$

wherein Rx_input, Gx_input, and Bx_input respectively represent an initial grayscale of a red sub-pixel, an initial grayscale of a green sub-pixel, and an initial grayscale of a blue sub-pixel in the display block at an x position; Rx_Gain, Gx_Gain, and Bx_Gain respectively represent the grayscale gain coefficient of the red sub-pixel, the grayscale gain coefficient of the green sub-pixel, and the grayscale gain coefficient of the blue sub-pixel in the display block at the x position; and Rx_Block_output, Gx_Block_output, and Bx_Block_output respectively represent a target grayscale of the red sub-pixel, a target grayscale of the green sub-pixel, and a target grayscale of the blue sub-pixel in the display block at the x position, and wherein the target grayscales correspond to the target brightness;

determining that an area where 2N rows and/or columns of the sub-pixels starting from a boundary between the adjacent two display blocks are located is a boundary area; and performing an interpolation method to process the grayscale, corresponding to the target brightness, of each sub-pixel located in the boundary area, wherein the process of performing the interpolation method to process the grayscale, corresponding to the target brightness, of each sub-pixel located in the boundary area comprises:

$$Rm\_Block\_output1 = (Rx\_Block\_output - Rx{+}1\_Block\_output)/2N * m + Rx\_Block\_output$$

$$Gm\_Block\_output1 = (Gx\_Block\_output - Gx{+}1\_Block\_output)/2N * m + Gx\_Block\_output$$

$$Bm\_Block\_output1 = (Bx\_Block\_output - Bx{+}1\_Block\_output)/2N * m + Bx\_Block\_output$$

wherein N is a number of the rows or columns of the sub-pixels starting from the boundary and located in the boundary area in the corresponding display block, m is a row number or a column number of the sub-pixel starting from the boundary; Rm_Block_output1, Gm_Block_output1, and Bm_Block_output1 represent an interpolated grayscale of the red sub-pixel of the m-th row/column, an interpolated grayscale of the green sub-pixel of the m-th row/column, and an interpolated grayscale of the blue sub-pixel of the m-th row/column; Rx+1_Block_output, Gx+1_Block_output, and Bx+1_Block_output represent the target grayscale of the red sub-pixel, the target grayscale of the green sub-pixel, and the target grayscale of the blue sub-pixel in the display block at an (x+1) position; and the display block where the sub-pixel of the m-th row/column is located is adjacent to the display block at the x position and the display block at the (x+1) position.

2. The grayscale compensation method according to claim 1, further comprising:

determining the corresponding sub-pixels in the boundary area that are repeatedly processed by the interpolation method; and averaging the grayscales of the corresponding sub-pixels repeatedly processed by the interpolation method.

3. The grayscale compensation method according to claim 2, wherein the process of averaging the grayscales of the corresponding sub-pixels repeatedly processed by the interpolation method comprises:

$$Rm\_Block\_output = (Rm\_Block\_output1 + Rm{+}1\_Block\_output1)/2$$

$$Gm\_Block\_output = (Gm\_Block\_output1 + Gm{+}1\_Block\_output1)/2$$

$$Bm\_Block\_output = (Bm\_Block\_output1 + Bm{+}1\_Block\_output1)/2$$

wherein Rm_Block_output, Gm_Block_output, and Bm_Block_output respectively represent an averaged grayscale of the red sub-pixels, an averaged grayscale of the green sub-pixels, and an averaged grayscale of the blue sub-pixels in the m-th row/column repeatedly processed by the interpolation method; and Rm+1_Block_output1, Gm+1_Block_output1, and Bm+1_Block_output1 respectively represent the grayscale of the red sub-pixel after the sub-pixels in the (m+1)-th row/column are processed by the interpolation method, the grayscale of the green sub-pixel after the sub-pixels in the (m+1)-th row/column are processed by the interpolation process, and the grayscale of the blue sub-pixel after the sub-pixels in the (m+1)-th row/column are processed by the interpolation process.

4. The grayscale compensation method according to claim 1, wherein before the step of compensating the grayscale of each sub-pixel in the at least one second display sub-area until the target brightness is reached, the grayscale compensation method further comprises:

determining whether a frame image to be displayed is a frame image of a designated type, and the frame image of the designated type is a frame image whose brightness uniformity is less than or equal to brightness uniformity of a frame image with a preset ratio and a normal visual effect;

If affirmative, performing the step of compensating the grayscale of each sub-pixel in the at least one second display sub-area until the target brightness is reached; and If negative, directly displaying the frame image to be displayed.

5. A display panel, comprising:

a timing controller, wherein the timing controller stores a grayscale compensation table, and the grayscale compensation table is made according to a grayscale compensation method, the grayscale compensation method comprising:

configuring a display area of the display panel as at least one first display sub-area and at least one second display sub-area;

determining average brightness of the at least one second display sub-area as target brightness;

compensating a grayscale of each sub-pixel in the at least one second display sub-area until the target brightness is reached;

configuring the display area as one first display sub-area and eight second display sub-areas, wherein an area of the first display sub-area is same as an area of each of the eight second display sub-areas;

constructing the first display sub-area and the eight second display sub-areas to be an array;

determining the average brightness of at least one of the first one and the third one of the second display sub-areas from left to right in a second row as the target brightness;

determining a resolution of the display panel;

based on the resolution, dividing each of the second display sub-areas into at least one display block, wherein the resolution is proportional to a number of the at least one display block in the same second display sub-area;

determining grayscale gain coefficients corresponding to the sub-pixels of various colors in each of the display blocks; and individually adjusting the grayscale gain coefficients corresponding to the sub-pixels of various colors until the target brightness is reached, wherein the process of individually adjusting the grayscale gain coefficients corresponding to the sub-pixels of various colors until the target brightness is reached comprises:

$$Rx\_\text{Block\_output}=Rx\_\text{input}*Rx\_\text{Gain}$$

$$Gx\_\text{Block\_output}=Gx\_\text{input}*Gx\_\text{Gain}$$

$$Bx\_\text{Block\_output}=Bx\_\text{input}*Bx\_\text{Gain}$$

wherein Rx_input, Gx_input, and Bx_input respectively represent an initial grayscale of a red sub-pixel, an initial grayscale of a green sub-pixel, and an initial grayscale of a blue sub-pixel in the display block at an x position; Rx_Gain, Gx_Gain, and Bx_Gain respectively represent the grayscale gain coefficient of the red sub-pixel, the grayscale gain coefficient of the green sub-pixel, and the grayscale gain coefficient of the blue sub-pixel in the display block at the x position; and Rx_Block_output, Gx_Block_output, and Bx_Block_output respectively represent a target grayscale of the red sub-pixel, a target grayscale of the green sub-pixel, and a target grayscale of the blue sub-pixel in the display block at the x position, and wherein the target grayscales correspond to the target brightness;

determining that an area where 2N rows and/or columns of the sub-pixels starting from a boundary between the adjacent two display blocks are located is a boundary area; and performing an interpolation method to process the grayscale, corresponding to the target brightness, of each sub-pixel located in the boundary area, wherein the process of performing the interpolation method to process the grayscale, corresponding to the target brightness, of each sub-pixel located in the boundary area comprises:

$$Rm\_\text{Block\_output1}=(Rx\_\text{Block\_output}-Rx+1\_\text{Block\_output})/2N*m+Rx\_\text{Block\_output}$$

$$Gm\_\text{Block\_output1}=(Gx\_\text{Block\_output}-Gx+1\_\text{Block\_output})/2N*m+Gx\_\text{Block\_output}$$

$$Bm\_\text{Block\_output1}=(Bx\_\text{Block\_output}-Bx+1\_\text{Block\_output})/2N*m+Bx\_\text{Block\_output}$$

wherein N is a number of the rows or columns of the sub-pixels starting from the boundary and located in the boundary area in the corresponding display block, m is a row number or a column number of the sub-pixel starting from the boundary; Rm_Block_output1, Gm_Block_output1, and Bm_Block_output1 represent an interpolated grayscale of the red sub-pixel of the m-th row/column, an interpolated grayscale of the green sub-pixel of the m-th row/column, and an interpolated grayscale of the blue sub-pixel of the m-th row/column; Rx+1_Block_output, Gx+1_Block_output, and Bx+1_Block_output represent the target grayscale of the red sub-pixel, the target grayscale of the green sub-pixel, and the target grayscale of the blue sub-pixel in the display block at an (x+1) position; and the display block where the sub-pixel of the m-th row/column is located is adjacent to the display block at the x position and the display block at the (x+1) position.

6. The display panel according to claim 5, wherein the grayscale compensation method further comprises:

determining the corresponding sub-pixels in the boundary area that are repeatedly processed by the interpolation method; and averaging the grayscales of the corresponding sub-pixels repeatedly processed by the interpolation method.

7. The display panel according to claim 6, wherein the process of averaging the grayscales of the corresponding sub-pixels repeatedly processed by the interpolation method comprises:

$$Rm\_\text{Block\_output}=(Rm\_\text{Block\_output1}+Rm+1\_\text{Block\_output1})/2$$

$$Gm\_Block\_output = (Gm\_Block\_output1 + Gm+1\_Block\_output1)/2$$

$$Bm\_Block\_output = (Bm\_Block\_output1 + Bm+1\_Block\_output1)/2$$

wherein Rm_Block_output, Gm_Block_output, and Bm_Block_output respectively represent an averaged grayscale of the red sub-pixels, an averaged grayscale of the green sub-pixels, and an averaged grayscale of the blue sub-pixels in the m-th row/column repeatedly processed by the interpolation method; and Rm+1_Block_output1, Gm+1_Block_output1, and Bm+1 Block_output1 respectively represent the grayscale of the red sub-pixel after the sub-pixels in the (m+1)-th row/column are processed by the interpolation method, the grayscale of the green sub-pixel after the sub-pixels in the (m+1)-th row/column are processed by the interpolation process, and the grayscale of the blue sub-pixel after the sub-pixels in the (m+1)-th row/column are processed by the interpolation process.

8. The display panel according to claim 5, wherein before the step of compensating the grayscale of each sub-pixel in the at least one second display sub-area until the target brightness is reached, the grayscale compensation method further comprises:

determining whether a frame image to be displayed is a frame image of a designated type, and the frame image of the designated type is a frame image whose brightness uniformity is less than or equal to brightness uniformity of a frame image with a preset ratio and a normal visual effect;

If affirmative, performing the step of compensating the grayscale of each sub-pixel in the at least one second display sub-area until the target brightness is reached; and If negative, directly displaying the frame image to be displayed.

* * * * *